United States Patent
Prakash et al.

(10) Patent No.: US 11,257,074 B2
(45) Date of Patent: Feb. 22, 2022

(54) TRANSACTION RISK BASED TOKEN

(71) Applicant: Visa International Service Association, San Francisco, CA (US)

(72) Inventors: Gyan Prakash, Foster City, CA (US); Ajit Gaddam, Sunnyvale, CA (US); Selim Aissi, Menlo Park, CA (US); Christian Aabye, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 1857 days.

(21) Appl. No.: 14/869,147

(22) Filed: Sep. 29, 2015

(65) Prior Publication Data
US 2016/0092872 A1    Mar. 31, 2016

Related U.S. Application Data

(60) Provisional application No. 62/057,204, filed on Sep. 29, 2014.

(51) Int. Cl.
*G06Q 20/38*    (2012.01)
*G06Q 20/40*    (2012.01)
(Continued)

(52) U.S. Cl.
CPC ....... *G06Q 20/3829* (2013.01); *G06Q 20/322* (2013.01); *G06Q 20/36* (2013.01);
(Continued)

(58) Field of Classification Search
CPC .. G06Q 20/3829; G06Q 20/322; G06Q 20/36; G06Q 20/3823; G06Q 20/3825; G06Q 20/401; G06Q 2220/00
(Continued)

(56) References Cited

U.S. PATENT DOCUMENTS 5,613,012 A    3/1997    Hoffman
5,781,438 A    7/1998    Lee
(Continued)

FOREIGN PATENT DOCUMENTS

EP    2156397 A1    2/2010
WO    2001035304 A1    5/2001
(Continued)

OTHER PUBLICATIONS

Ron White, How Computers Work, Oct. 15, 2003, Paul Boger, Illustrated by Timothy Edward Downs, 7th Edition (Year: 2003).*
(Continued)

*Primary Examiner* — Mohammad A. Nilforoush
*Assistant Examiner* — Wodajo Getachew
(74) *Attorney, Agent, or Firm* — Kilpatrick Townsend & Stockton LLP

(57) ABSTRACT

Embodiments of the invention provision multiple payment tokens on a communication device. The communication device may be provisioned with multiple limited use keys (LUK), each LUK being associated with a specific type of transaction. When the communication device is used for a transaction, the communication device automatically determines a type of the transaction and selects an appropriate LUK based on the determined transaction type. The selected LUK may be used to create a cryptogram, which can be used to verify the transaction.

12 Claims, 7 Drawing Sheets

(51) Int. Cl.
  *G06Q 20/32* (2012.01)
  *G06Q 20/36* (2012.01)
(52) U.S. Cl.
  CPC ..... *G06Q 20/3823* (2013.01); *G06Q 20/3825* (2013.01); *G06Q 20/401* (2013.01); *G06Q 2220/00* (2013.01)
(58) Field of Classification Search
  USPC .......................................................... 705/65
  See application file for complete search history.

(56) References Cited

U.S. PATENT DOCUMENTS

| | | | |
|---|---|---|---|
| 5,883,810 | A | 3/1999 | Franklin |
| 5,953,710 | A | 9/1999 | Fleming |
| 5,956,699 | A | 9/1999 | Wong |
| 6,000,832 | A | 12/1999 | Franklin |
| 6,014,635 | A | 1/2000 | Harris |
| 6,044,360 | A | 3/2000 | Picciallo |
| 6,163,771 | A | 12/2000 | Walker |
| 6,227,447 | B1 | 5/2001 | Campisano |
| 6,236,981 | B1 | 5/2001 | Hill |
| 6,267,292 | B1 | 7/2001 | Walker |
| 6,327,578 | B1 | 12/2001 | Linehan |
| 6,341,724 | B2 | 1/2002 | Campisano |
| 6,385,596 | B1 | 5/2002 | Wiser |
| 6,422,462 | B1 | 7/2002 | Cohen |
| 6,425,523 | B1 | 7/2002 | Shem Ur |
| 6,592,044 | B1 | 7/2003 | Wong |
| 6,636,833 | B1 | 10/2003 | Flitcroft |
| 6,748,367 | B1 | 6/2004 | Lee |
| 6,805,287 | B2 | 10/2004 | Bishop |
| 6,879,965 | B2 | 4/2005 | Fung |
| 6,891,953 | B1 | 5/2005 | DeMello |
| 6,901,387 | B2 | 5/2005 | Wells |
| 6,931,382 | B2 | 8/2005 | Laage |
| 6,938,019 | B1 | 8/2005 | Uzo |
| 6,941,285 | B2 | 9/2005 | Sarcanin |
| 6,980,670 | B1 | 12/2005 | Hoffman |
| 6,990,470 | B2 | 1/2006 | Hogan |
| 6,991,157 | B2 | 1/2006 | Bishop |
| 7,051,929 | B2 | 5/2006 | Li |
| 7,069,249 | B2 | 6/2006 | Stolfo |
| 7,103,576 | B2 | 9/2006 | Mann, III |
| 7,113,930 | B2 | 9/2006 | Eccles |
| 7,136,835 | B1 | 11/2006 | Flitcroft |
| 7,177,835 | B1 | 2/2007 | Walker |
| 7,177,848 | B2 | 2/2007 | Hogan |
| 7,194,437 | B1 | 3/2007 | Britto |
| 7,209,561 | B1 | 4/2007 | Shankar et al. |
| 7,264,154 | B2 | 9/2007 | Harris |
| 7,287,692 | B1 | 10/2007 | Patel |
| 7,292,999 | B2 | 11/2007 | Hobson |
| 7,350,230 | B2 | 3/2008 | Forrest |
| 7,353,382 | B2 | 4/2008 | Labrou |
| 7,379,919 | B2 | 5/2008 | Hogan |
| RE40,444 | E | 7/2008 | Linehan |
| 7,415,443 | B2 | 8/2008 | Hobson |
| 7,444,676 | B1 | 10/2008 | Asghari-Kamrani |
| 7,469,151 | B2 | 12/2008 | Khan |
| 7,548,889 | B2 | 6/2009 | Bhambri |
| 7,567,934 | B2 | 7/2009 | Flitcroft |
| 7,567,936 | B1 | 7/2009 | Peckover |
| 7,571,139 | B1 | 8/2009 | Giordano |
| 7,571,142 | B1 | 8/2009 | Flitcroft |
| 7,580,898 | B2 | 8/2009 | Brown |
| 7,584,153 | B2 | 9/2009 | Brown |
| 7,593,896 | B1 | 9/2009 | Flitcroft |
| 7,606,560 | B2 | 10/2009 | Labrou |
| 7,627,531 | B2 | 12/2009 | Breck |
| 7,627,895 | B2 | 12/2009 | Gifford |
| 7,650,314 | B1 | 1/2010 | Saunders |
| 7,685,037 | B2 | 3/2010 | Reiners |
| 7,702,578 | B2 | 4/2010 | Fung |
| 7,707,120 | B2 | 4/2010 | Dominguez |
| 7,712,655 | B2 | 5/2010 | Wong |
| 7,734,527 | B2 | 6/2010 | Uzo |
| 7,753,265 | B2 | 7/2010 | Harris |
| 7,770,789 | B2 | 8/2010 | Oder, II |
| 7,784,685 | B1 | 8/2010 | Hopkins, III |
| 7,793,851 | B2 | 9/2010 | Mullen |
| 7,801,826 | B2 | 9/2010 | Labrou |
| 7,805,376 | B2 | 9/2010 | Smith |
| 7,805,378 | B2 | 9/2010 | Berardi |
| 7,818,264 | B2 | 10/2010 | Hammad |
| 7,828,220 | B2 | 11/2010 | Mullen |
| 7,835,960 | B2 | 11/2010 | Breck |
| 7,841,523 | B2 | 11/2010 | Oder, II |
| 7,841,539 | B2 | 11/2010 | Hewton |
| 7,844,550 | B2 | 11/2010 | Walker |
| 7,848,980 | B2 | 12/2010 | Carlson |
| 7,849,020 | B2 | 12/2010 | Johnson |
| 7,853,529 | B1 | 12/2010 | Walker |
| 7,853,995 | B2 | 12/2010 | Chow |
| 7,865,414 | B2 | 1/2011 | Fung |
| 7,873,579 | B2 | 1/2011 | Hobson |
| 7,873,580 | B2 | 1/2011 | Hobson |
| 7,890,393 | B2 | 2/2011 | Talbert |
| 7,891,563 | B2 | 2/2011 | Oder, II |
| 7,896,238 | B2 | 3/2011 | Fein |
| 7,908,216 | B1 | 3/2011 | Davis et al. |
| 7,922,082 | B2 | 4/2011 | Muscato |
| 7,931,195 | B2 | 4/2011 | Mullen |
| 7,937,324 | B2 | 5/2011 | Patterson |
| 7,938,318 | B2 | 5/2011 | Fein |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders |
| 8,046,256 | B2 | 10/2011 | Chien |
| 8,060,448 | B2 | 11/2011 | Jones |
| 8,060,449 | B1 | 11/2011 | Zhu |
| 8,074,877 | B2 | 12/2011 | Mullen |
| 8,074,879 | B2 | 12/2011 | Harris |
| 8,082,210 | B2 | 12/2011 | Hansen |
| 8,095,113 | B2 | 1/2012 | Kean |
| 8,104,679 | B2 | 1/2012 | Brown |
| RE43,157 | E | 2/2012 | Bishop |
| 8,109,436 | B1 | 2/2012 | Hopkins, III |
| 8,121,942 | B2 | 2/2012 | Carlson |
| 8,121,956 | B2 | 2/2012 | Carlson |
| 8,123,128 | B1 | 2/2012 | Zhu |
| 8,126,449 | B2 | 2/2012 | Beenau |
| 8,171,525 | B1 | 5/2012 | Pelly |
| 8,175,973 | B2 | 5/2012 | Davis et al. |
| 8,190,523 | B2 | 5/2012 | Patterson |
| 8,196,813 | B2 | 6/2012 | Vadhri |
| 8,205,791 | B2 | 6/2012 | Randazza |
| 8,219,489 | B2 | 7/2012 | Patterson |
| 8,224,702 | B2 | 7/2012 | Mengerink |
| 8,225,385 | B2 | 7/2012 | Chow |
| 8,229,852 | B2 | 7/2012 | Carlson |
| 8,265,993 | B2 | 9/2012 | Chien |
| 8,280,777 | B2 | 10/2012 | Mengerink |
| 8,281,991 | B2 | 10/2012 | Wentker et al. |
| 8,328,095 | B2 | 12/2012 | Oder, II |
| 8,336,088 | B2 | 12/2012 | Raj et al. |
| 8,346,666 | B2 | 1/2013 | Lindelsee et al. |
| 8,376,225 | B1 | 2/2013 | Hopkins, III |
| 8,380,177 | B2 | 2/2013 | Laracey |
| 8,387,873 | B2 | 3/2013 | Saunders |
| 8,401,539 | B2 | 3/2013 | Beenau |
| 8,401,898 | B2 | 3/2013 | Chien |
| 8,402,555 | B2 | 3/2013 | Grecia |
| 8,403,211 | B2 | 3/2013 | Brooks |
| 8,412,623 | B2 | 4/2013 | Moon |
| 8,412,837 | B1 | 4/2013 | Emigh |
| 8,417,642 | B2 | 4/2013 | Oren |
| 8,447,699 | B2 | 5/2013 | Batada |
| 8,453,223 | B2 | 5/2013 | Svigals |
| 8,453,925 | B2 | 6/2013 | Fisher |
| 8,458,487 | B1 | 6/2013 | Palgon |
| 8,484,134 | B2 | 7/2013 | Hobson |
| 8,485,437 | B2 | 7/2013 | Mullen |

(56) References Cited

U.S. PATENT DOCUMENTS

| | | |
|---|---|---|
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0280880 A1* | 11/2010 | Faith ............... G06Q 40/00 705/7.37 |
| 2010/0291904 A1 | 11/2010 | Musfeldt |

(56) References Cited

U.S. PATENT DOCUMENTS

| | | |
|---|---|---|
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1* | 12/2012 | Royyuru ............ G06Q 30/06 705/71 |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0080272 A1 | 3/2013 | Ronca |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0132283 A1* | 5/2013 | Hayhow ............ G06Q 20/1085 705/67 |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |

(56) References Cited

U.S. PATENT DOCUMENTS

| | | |
|---|---|---|
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0122331 A1 | 5/2014 | Vaish et al. |
| 2014/0136417 A1 | 5/2014 | Spodak et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0191028 A1 | 7/2014 | Laracey |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0058146 A1 | 2/2015 | Gaddam |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0103675 A1 | 4/2016 | Aabye et al. |
| 2016/0119296 A1 | 4/2016 | Laxminarayanan et al. |
| 2016/0224976 A1 | 8/2016 | Basu |
| 2017/0046696 A1 | 2/2017 | Powell et al. |
| 2017/0103387 A1 | 4/2017 | Weber |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Chipman, et al., U.S. Appl. No. 15/265,282 (Unpublished), Self-Cleaning Token Vault, filed Sep. 14, 2016.

Lopez, et al., U.S. Appl. No. 15/462,658 (Unpublished), Replacing Token on a Multi-Token User Device, filed Mar. 17, 2017.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

McGuire, U.S. Appl. No. 14/600,523 (unpublished), Secure Payment Processing Using Authorization Request filed Jan. 20, 2015.

Flurscheim et al., U.S. Appl. No. 15/004,705 (unpublished), Cloud-Based Transactions With Magnetic Secure Transmission filed Jan. 22, 2016.

Flurscheim et al., U.S. Appl. No. 62/108,403 (unpublished), Wearables With NFC HCE filed Jan. 27, 2015.

Sabba et al., U.S. Appl. No. 15/011,366 (unpublished), Token Check Offline filed Jan. 29, 2016.

Patterson, U.S. Appl. No. 15/019,157 (unpublished), Token Processing Utilizing Multiple Authorizations filed Feb. 9, 2016.

(56) References Cited

OTHER PUBLICATIONS

Cash et al., U.S. Appl. No. 15/041,495 (unpublished), Peer Forward Authorization of Digital Requests filed Feb. 11, 2016.
Le Saint et al., , U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-the-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.

* cited by examiner

TRANSACTION RISK BASED TOKEN

RELATED APPLICATIONS

This application claims the benefit of and priority to U.S. Provisional Application No. 62/057,204, filed Sep. 29, 2014, the entire contents of which are incorporated herein by reference for all purposes.

BACKGROUND

In a traditional transaction, sensitive user data (e.g., primary account number (PAN), social security number, identification number, etc. of the user) is exposed to various entities involved in a transaction. For example, in a traditional payment transaction, the user data may be passed from a merchant terminal to an acquirer system, a payment processing network, payment gateways, etc.

Because sensitive user data can be exposed to various entities in a transaction, "tokens" have been developed to conduct transactions. A token serves as an additional security layer to the sensitive user data and in effect becomes a proxy/surrogate to the user data. Thus, the token may be used in place of the user data in transactions. The use of tokens instead of sensitive user data can reduce the risk of fraudulent activity since the sensitive user data is not exposed and is not accessible to unauthorized persons during a transaction.

Although tokens reduce the risk of fraudulently conducted transactions, it would be desirable to reduce the risk of fraudulently conducted transactions even more. It is possible to create different tokens for different types of payment channels (e.g., card present, card not present, etc.) so that if one token for one specific channel is compromised, tokens for other channels are not compromised. While this is a useful solution, this can also create some problems. For example, a payment token may be 16 digits long and may be standardized. If a different payment token is created for six different potential communication channels, then the number of tokens that may be associated with a single account for a single person would increase by six relative to the case where that person only has a single token for all channels. The six fold increase in the number of payment tokens in this example can lead to issues regarding the number of available tokens that can be created if there are in fact millions of potential users. Additionally, even if it is possible to create different tokens for different interaction channels for each account in a transaction system, it would be desirable to further improve upon the security of transactions in such transaction systems.

Embodiments of the present invention solve these problems and other problems, individually and collectively.

BRIEF SUMMARY

Embodiments of the present invention allow for creating a cryptogram with an encryption key based on a transaction type. The cryptogram can be used with a token and can be used as a validation mechanism. Thus, even if the token or the encryption key is obtained by an unauthorized person, that unauthorized person must also know the type of transaction that the token and the cryptogram are used for. Embodiments improve the secure of transactions relative to conventional transactions.

According to various embodiments, the transaction type and/or the mobile device capability may define how transaction data should be encrypted for a given transaction. For example, the mobile device may automatically select, in real-time, a first encryption key to encrypt the transaction data for transactions at a merchant terminal (e.g., card-present transactions), a second encryption key to encrypt the transaction data for online transactions (e.g., card-not-present transactions), a third encryption key to encrypt the transaction data for low value transactions, a fourth encryption key to encrypt the transaction data for high value transactions, a fifth encryption key to encrypt the transaction data for local transactions, a sixth encryption key to encrypt the transaction data for non-local transactions, etc.

During a transaction lifecycle, the encrypted token is provided to a payment processing network in an authorization request message. The payment processing network (alone or based on interaction with an issuer) may approve or deny the authorization for the transaction. For example, if the payment processing network determines that the encrypted transaction data provided for a low value transaction is in fact generated using a high value encryption key (e.g., encryption key intended for encrypting transaction data for high value transactions), the payment processing network may determine that the encryption key has been compromised, and hence, deny the transaction authorization request.

According to some embodiments, a method may include receiving, at a communication device, a token and a plurality of encryption keys associated with an account. Each encryption key may be associated with a use policy. The method may also include initiating a transaction through the communication device. The communication device may receive transaction data for the transaction through a communication channel, and detect a transaction type based on the transaction data or the communication channel. The method may further include comparing, by the communication device, the transaction type to use policies associated with the plurality of encryption keys to find a specific use policy matching the transaction type. The communication device may automatically select a specific encryption key among the plurality of encryption keys. The specific encryption key is associated with the specific use policy matching the transaction type. The communication device may generate a cryptogram using the specific encryption key and provide the cryptogram to a transacting entity to perform the transaction.

According to some embodiments, a communication device may include a processor; and a memory coupled to the processor and storing a mobile application that performs operations that include receiving a token and a plurality of encryption keys associated with an account. Each encryption key may be associated with a use policy. The operations may also include initiating a transaction through the communication device and receive transaction data for the transaction through a communication channel. The operations may further include detecting a transaction type based on the transaction data or the communication channel. The transaction type may be compared to use policies associated with the plurality of encryption keys to find a specific use policy matching the transaction type. The operations may further include automatically selecting a specific encryption key among the plurality of encryption keys. The specific encryption key is associated with the specific use policy matching the transaction type. The operations may also include generating a cryptogram using the specific encryption key and provide the cryptogram to a transacting entity to perform the transaction.

According to some embodiments, a method may include receiving, at a server computer, an authorization request message for a transaction initiated by a communication device. The authorization request message may include a cryptogram and transaction type of the transaction. The server computer may determine whether the cryptogram is generated using an encryption key created for the transaction type. If the cryptogram was generated using the encryption key created for the transaction type, the server computer may approve the transaction. If the cryptogram was not generated using the encryption key created for the transaction type, then the server computer may deny the transaction.

These and other embodiments are described in further detail below.

DETAILED DESCRIPTION

Figure 1A:
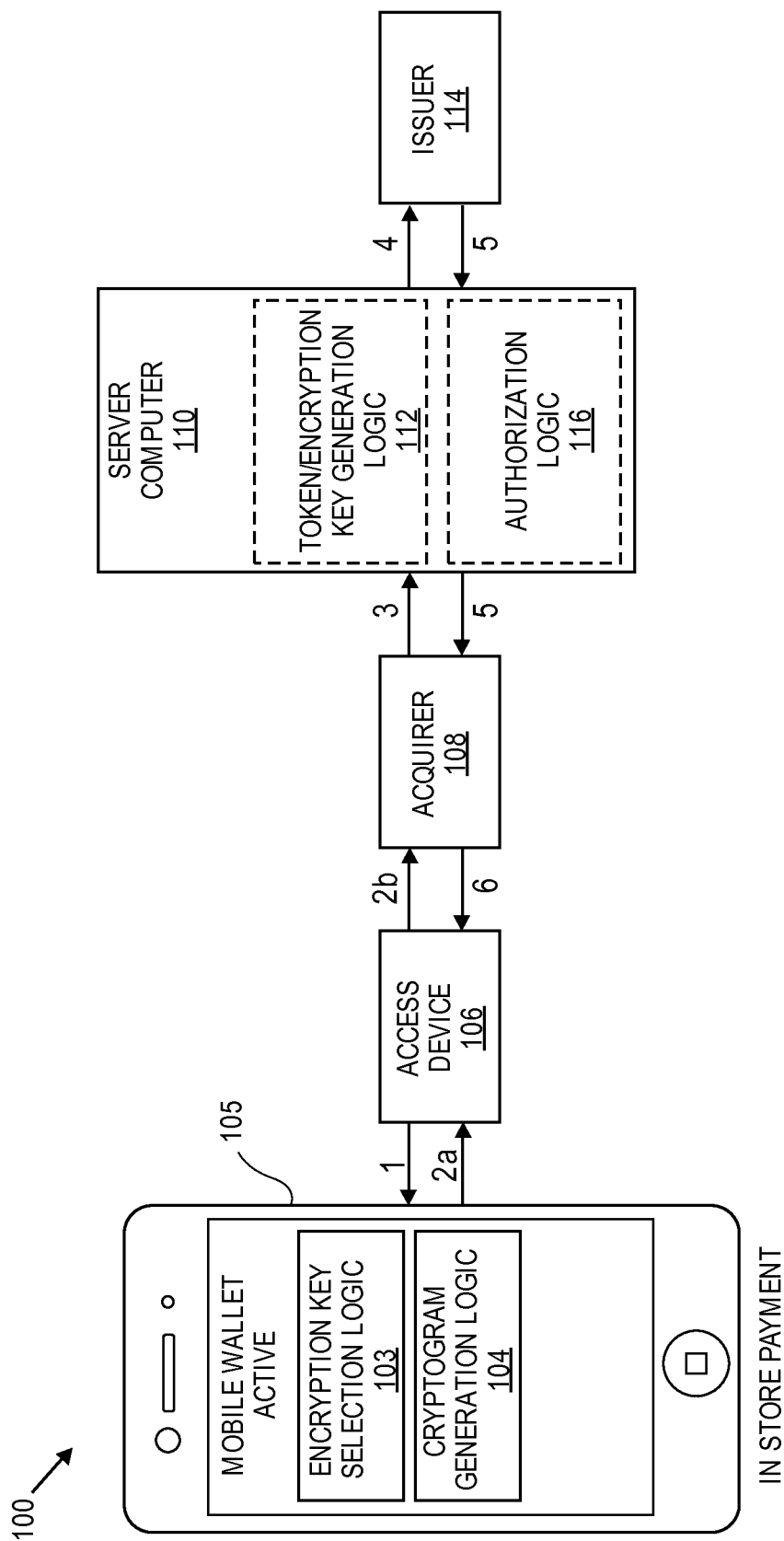
FIG. 1A shows a system and a flow diagram of a processing system for selecting an encryption key for an in person transaction in accordance with embodiments of the invention.

Embodiments of the invention are directed to methods, systems, devices, and computers for the generating multiple encryption keys (e.g., limited use keys (LUKs)). Each encryption key can be used to encrypt data to form a cryptogram. The data that is encrypted may be static information or dynamic information. Static information may include account information including an actual primary account number (PAN) or a static string of numbers or characters. Dynamic information may include transaction information including one or more of the date of the transaction, the amount of the transaction, etc.

Each encryption key can be associated with a specific use policy. For example, encryption keys can be specifically associated with one or more transaction types including the following: in person transactions (e.g., card-present transaction), remote transactions (e.g., card-not-present transactions), low value transactions (e.g., transactions less than or equal to $100), high value transactions (e.g., transactions greater than $100), geographic location-specific transactions, merchant-specific transactions, transactions conducted at specific times, etc.

In a more specific illustration, multiple limited use keys (e.g., LUKs), which may be valid for only a specific time period or number of transactions, may be generated by a remote server computer (e.g., payment processing server computer or a token server computer) using a Unique Derived Key (UDK). Each encryption key may be associated with a different transaction type and corresponding use policy. For example, a first LUK may be associated with a first use policy, which limits the first LUK and a corresponding payment token's use to e-commerce transactions (i.e. a card-not-present transaction), a second LUK may be associated with a second use policy, which limits the second LUK and a corresponding payment token's use to in person transactions (e.g., a card-present transaction), a third LUK may be associated with a third use policy, which limits the third LUK and a corresponding payment token's use to low value transactions, a fourth LUK may be associated with a fourth use policy for a high value transaction, which limits the fourth LUK and a corresponding payment token's use to only high value transactions, a fifth LUK may be associated with a fifth use policy, which limits the fifth LUK and a corresponding payment token's use to location specific transactions, and a sixth LUK may be associated with a sixth use policy, which limits the sixth LUK and a corresponding payment token's use to non-local transactions. Each LUK may be associated with a set of one or more limited-use thresholds that limit the number of transactions that can be conducted using the LUK.

The different use policies for the different LUKs may also correspond to different payment channels. Examples of different payment channels may include remote payment transactions, in person payment transactions, contactless transactions, contact based transactions, etc. The different payment channels may relate to the mode of the transaction being conducted and may be considered part of transaction data.

In embodiments of the invention, a token representing a user account may be provisioned on a user's mobile device. When a transaction is initiated using the mobile device, a data processor in the mobile device may determine the transaction type for the transaction, and select an encryption key to be used to encrypt the transaction data. For example, for a remote payment transaction (e.g., a card-not-present transaction or an online e-commerce transaction), the data processor in the mobile device may automatically determine, in real-time, the specific encryption key that is used to create cryptograms for remote payment transactions. A cryptogram is then generated by encrypting data (e.g., transaction data such as an amount) accessible to the data processor. Both the cryptogram and the token are then transmitted by the mobile device to a merchant computer (e.g., a merchant Web server or a merchant access device such as a POS terminal). The merchant computer then transmits the cryptogram and the token to a central server computer, when then verifies that the cryptogram. The central server computer may also determine the type of transaction being conducted, may select the appropriate encryption key, and may generate the cryptogram in the same way that the mobile device generated the cryptogram. If the cryptograms match, the central server computer can then conclude that the token can be processed.

As noted above, a token may correspond to a particular LUK, and the LUK may be used to generate a corresponding cryptogram. Both the cryptogram and the token may therefore vary according to the different payment channel and/or transaction characteristics. By varying both the LUK (and consequently the characteristics of the generated cryptogram) and the token, embodiments of the invention provide for a much more secure transaction system. If the LUK and/or token is compromised, the risk of future theft is very small or is minimized, because the LUK has a limited use lifetime and the token is substitute for a real account number and may also have a limited use lifetime. Further, even if one were to obtain the LUK, they would also need to know the specific payment channel and/or use policies associated with the LUK to be effective. Thus, embodiments of the invention provide for a number of technical improvements over conventional systems.

In some embodiments, the transactions that are conducted using the mobile device may be categorized as secure element-based transactions or cloud-based transactions. In secure element-based transactions, the encryption keys may be stored on a secure element of a mobile device along with one or more tokens associated with a user account. In cloud-based transactions, the encryption keys may be stored on the cloud (e.g., at one or more remote server computers or databases). In some embodiments, a portion of an encryption key may be stored on the secure element in a mobile device, while the remainder of the encryption key may be stored at a different location (e.g., a remote server or in another memory in the mobile device).

Before discussing specific embodiments and examples, some descriptions of terms used herein are provided below.

A "token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

An "encryption key" may refer to a piece of information that is used in a cryptographic algorithm to transform input data into another representation. An exemplary encryption key may include a limited use key (LUK) derived using a Unique Derived Key (UDK). A UDK may include an encryption key that is derived from account specific information such as a real account number and a master derivation key. Because it is derived from a real account number, the UDK can be specifically associated with a particular user. Further details regarding UDKs can be found in U.S. Published Patent Application No. 2005/0043997, which is herein incorporated by reference in its entirety for all purposes and is assigned to the same assignee as the present application. An LUK can be an encryption key that is intended for limited use (e.g., a limited number of transactions or a limited time period) and is not intended to be used for the lifetime of an account. Further details regarding LUKs can be found in U.S. Published Patent Application No. 2015/0180836, which is herein incorporated by reference in its entirety and is assigned to the same assignee as the present application.

A "cryptographic algorithm" can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. Encryption techniques may include symmetric and asymmetric encryption techniques.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram. For example, the underlying information may be transaction data.

"Transaction data" may refer to information associated with a transaction. For example, transaction data may include one or more of an authorized amount (e.g., purchase amount, item value, etc.), other amount, terminal country code, terminal verification results, transaction currency code, transaction date, transaction type (e.g., card-present transaction, card-not-present transaction, high value transaction, low value transaction, local transaction, international transaction, etc.), an unpredictable number, application interchange profile (AIP), application transaction counter (ATC), issuer application data (IAD), etc.

"Sensitive user data" may refer to information for which protection from unauthorized usage is desired, or information for which privacy protection is desired. For example, sensitive user data may refer to confidential information, or may refer to information that can be used by an unauthorized entity to commit fraud such as fraudulent transactions or identity theft. Examples of sensitive user data may include trade secret, corporate confidential information, confidential legal documents, government protected data, etc. Examples of sensitive user data may also include personal information such as health data, social security number, contact information, location information, and/or financial information such as account identifiers (e.g., primary account numbers or PANs), rewards information, loyalty program information, etc. Sensitive user data may also include cryptographic keys that can be used to encrypt or decrypt information.

"Provisioning" may include a process of providing data for use. Provisioning may include providing, delivering, or enabling a token on a device.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to a payment processing network and/or an issuer of a payment account to request authorization for a payment transaction. An authorization request message according to some embodiments may comply with ISO 8583, which is a standard for systems that exchange electronic transaction information associated with a payment made by a consumer using a payment device or a payment account. In some embodiments of the invention, an authorization request message may include a payment token. The payment token may include a payment token issuer identifier that may be a substitute for a real issuer identifier for an issuer. An authorization request message may also comprise additional data elements corresponding to "identification information" including, for example, a service code, a CVV (card verification value), a dCVV (dynamic card verification value), an expiration date, etc. An authorization request message may also comprise "transaction information," such as any information associated with a current transaction (e.g., the transaction amount, merchant identifier, merchant location, etc.) as well as any other information that may be utilized in determining whether to identify and/or authorize a payment transaction. The authorization request message may also include other information such as information that identifies the access device that generated the authorization request message, information about the location of the access device, etc. In some embodiments, the authorization request message may include limited-used account parameters.

An "authorization response message" may be an electronic message reply to an authorization request message generated by an issuing financial institution (i.e. issuer) or a payment processing network. The authorization response message may include an authorization code, which may be a code that an account issuing bank returns in response to an authorization request message in an electronic message (either directly or through the payment processing network) to the merchant's access device (e.g., POS terminal) that indicates approval of the transaction. The code may serve as proof of authorization. The authorization code may include, by way of example only, one or more of the following status indicators: Approval—transaction was approved; Decline—transaction was not approved; or Call Center—response pending more information, merchant must call the toll-free authorization phone number. As noted above, in some embodiments, a payment processing network may generate and/or forward the authorization response message to the merchant.

An "issuer" can include a payment account issuer. The payment account (which may be associated with one or more payment devices) may refer to any suitable payment account including a credit card account, a checking account, a savings account, a merchant account assigned to a consumer, or a prepaid account.

A "merchant" is typically an entity that engages in transactions and can sell goods or services, or provide access to goods or services.

An "acquirer" is typically a business entity (e.g., a commercial bank) that has a business relationship with a particular merchant or other entity. Some entities can perform both issuer and acquirer functions. Some embodiments may encompass such single entity issuer-acquirers.

A "payment processing network" may refer to an electronic payment system used to accept, transmit, or process transactions made by payment devices for money, goods, or services. The payment processing network may transfer information and funds among issuers, acquirers, merchants, and payment device users. An example of the payment processing network may include VisaNet™, operated by Visa®. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services.

A "cloud-based payment platform" according to various embodiments moves away from device-based security (e.g., secure element), and moves the functionality to the network, also referred to as the "cloud." By removing the requirement that a secure element be present, the payment credentials that may be stored on a mobile device are effectively subject to mobile application and operating system protection mechanisms. Embodiments of the present invention uses limited-use account parameters to conduct contactless payments. By managing the delivery and lifecycle of the limited-use account parameters between a set of network based capabilities and mobile devices, the compromise of the mobile application software or credentials stored on a mobile device becomes only a limited security risk.

A "communication device" may be a device that includes one or more electronic components (e.g., an integrated chip) that can communicate with another device.

A "mobile device" can be a communication device that can be transported and operated by a user and provide remote communication capabilities to a network. The mobile device can be configured to transmit and receive data or communications to and from other devices. A mobile device may be in the form of a mobile phone (e.g., smart phone, cellular phone, etc.), tablets, portable media player, personal digital assistant devices (PDAs), wearable computing device (e.g., watch), electronic reader device, etc., or in the form of a card (e.g., smart card) or a fob, etc. Examples of mobile devices may also include portable computing devices (e.g., laptops, netbooks, ultrabooks, etc.).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Figure 1B:
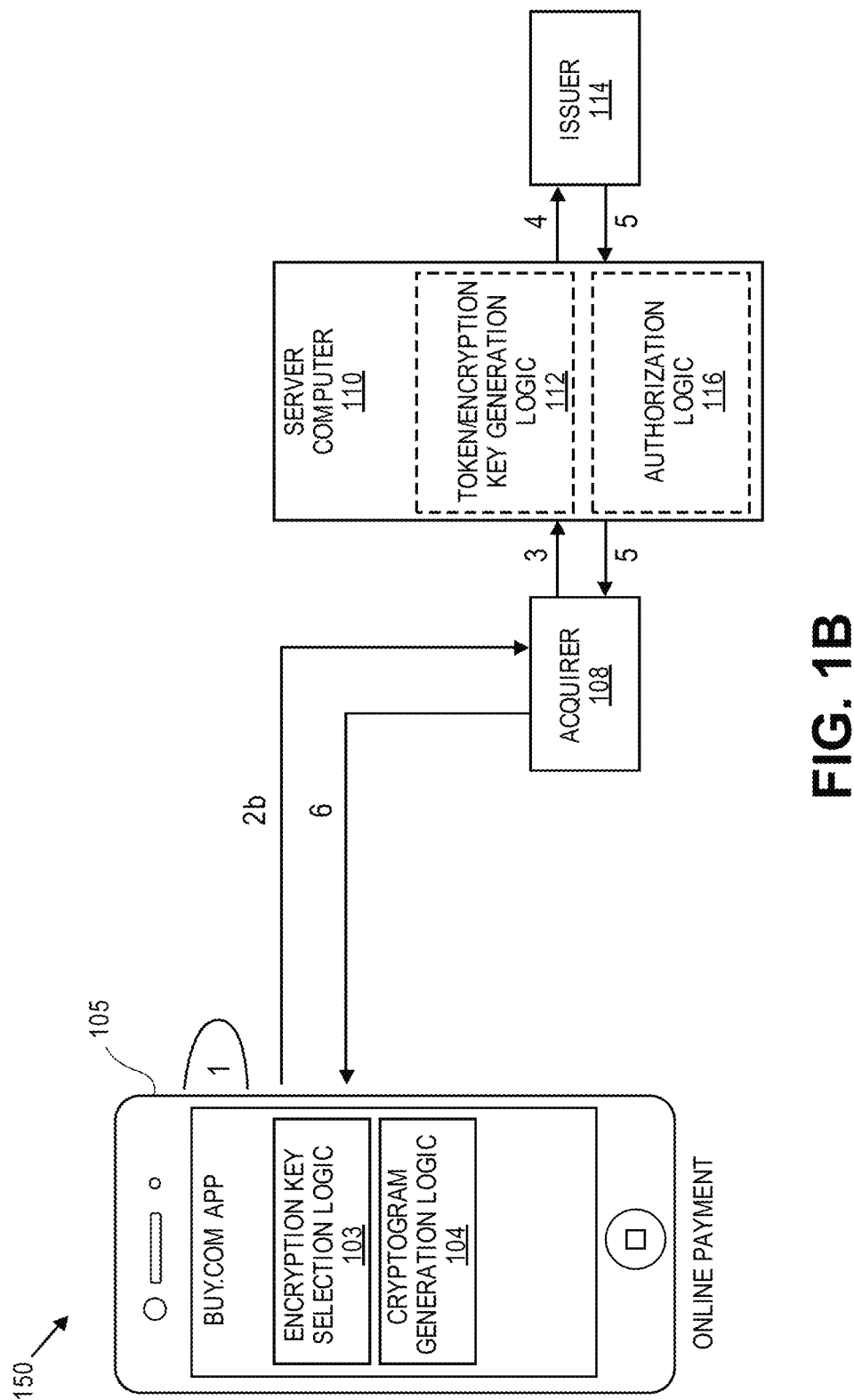
FIG. 1B shows a system and a flow diagram of a processing system for selecting an encryption key for a remote transaction in accordance with embodiments of the invention.

FIGS. 1A and 1B show a system and a flow diagram of a processing system for selecting an encryption key for an in person transaction (e.g., a card-present transaction) 100 and a remote payment transaction (e.g., a card-not-present transaction) 150, respectively.

Prior to the start of the in person transaction 100 or the remote payment transaction 150, the mobile device 105 may be provisioned with a token representing sensitive user data (e.g., an account number, social security number, an identification number, etc. of the user). The token may be generated by a token service provider (e.g., a token server computer) and provisioned on the mobile device 105. In the exemplary systems illustrated in FIGS. 1A and 1B, the token service provider is incorporated in a server computer 110 such as a payment processing server computer (which may reside in a payment processing network). In other embodiments, the token service provider may be an issuer 114 of the user account or a third-party system that can interact with the server computer 110 and/or the issuer 114 to generate and provision the token on the mobile device 105. The issuer 114 may operate its own issuer computer.

In some embodiments, the server computer 110 may comprise one or more processors; and a non-transitory computer readable storage medium communicatively coupled with the one or more processors and storing instructions which, when executed by the one or more processors. The instructions may cause the server computer to implement a method comprising: receiving an authorization request message for a transaction initiated by a communication device, wherein the authorization request message includes a cryptogram and transaction data; determining whether the cryptogram was generated using an encryption key created for a transaction type for the transaction; and if the cryptogram was generated using the encryption key created for the transaction type, then approving of the transaction, or if the cryptogram was not generated using the encryption key created for the transaction type, then denying the transaction.

The token service provider may also generate a plurality of encryption keys (e.g., limited use keys (LUKs)) that can be used to encrypt transaction data associated with a transaction. The token service provider may associate each encryption key with a use policy. The encryption key and use policy pairs may be stored on a remote server (e.g., the token server, a token vault, etc.) and/or on the mobile device. In some embodiments, some of the encryption key and use policy pairs may be stored on the remote server, while other encryption key and use policy pairs may be stored on the mobile device (e.g., on a secure element of the mobile device).

The LUKs may be used to generate a transaction cryptogram. For an integrated chip based transaction, the transaction cryptogram may be generated by encrypting dynamic transaction data using the appropriate LUK as an encryption key in an encryption function. The dynamic transaction data may include, for example, some or all of the terminal transaction data provided from the access device to the mobile application of the portable communication device during execution of the transaction. In some embodiments, the dynamic transaction data may include one or more of the following data elements: authorized amount, other amount, terminal country code, terminal verification results, transaction currency code, transaction date, transaction type, and unpredictable number; and/or may include the application interchange profile (AIP), application transaction counter (ATC), and issuer application data (IAD). In some embodiments, some data elements may be omitted, and/or additional data elements not specifically described can be included. The data set that makes up the dynamic transaction data is provided as input to the encryption function.

If the server computer 110 is the token service provider as illustrated in FIGS. 1A and 1B, the server computer 110 may include a token/encryption key generation logic 112 that is adapted to generate the token and the multiple encryption keys associated with use policies. The use policies may be based on transaction types, including but not limited to the location of the transaction (a local transaction versus a non-local transaction), an in person transaction, a remote payment transaction, a low value transaction, a high value transaction, etc.). The server computer 110 may then provision the token and the encryption keys (along with corresponding use cases) on the mobile device 105.

In some embodiments, the issuer 114 may act as the token service provider. In embodiments where the issuer 114 is the token service provider, the token/encryption key generation logic 112 may be incorporated in the issuer 114. The issuer may generate the token and multiple encryption keys using the token/encryption key generation logic 112 based on the transaction types. The issuer 114 may then provision the token and the encryption keys (along with corresponding use cases) on the mobile device 105. In some embodiments, the issuer 114 may provide a copy of the generated token and encryption keys to the server computer 110.

As illustrated in FIG. 1A, when the user wishes to conduct an in-store (e.g., card-present) transaction using the mobile device 105, the mobile device 105 may interact (e.g., via direct contact or in a contactless manner) with an access device 106 of a merchant to conduct an in person transaction at the merchant location. For example, the user may present the mobile device 105 to the access device 106 (e.g., a POS terminal) of the merchant. A mobile wallet such as a Host Card Emulation (HCE) wallet application may be activated on the mobile device 105. The mobile device 105 (e.g., the HCE wallet application on the mobile device 105) may interact with the access device 106 via a contactless interface. Examples of contactless communication methods that can use contactless interfaces can include a near-field communications (NFC) interface that can send and receive communications using radio frequency, and other wireless communication protocols such as Bluetooth, Wi-Fi, etc. Other examples of contactless interfaces may also include optical interfaces such as displays to present information such as quick response (QR) codes, bar codes, etc.

At step 1, the access device 106 may provide transaction data (or transaction details) to the mobile device 105. The transaction data may include an amount of the transaction (e.g., a value of the purchased good or service, an authorized amount), a merchant identifier, an access device identifier, a location of the merchant, terminal country code, terminal verification results, transaction currency code, transaction date, transaction type, and unpredictable number; and/or may include the application interchange profile (AIP), application transaction counter (ATC), issuer application data (IAD), etc. Based on the fact that the transaction data are received from the access device (as opposed to being provided in by an application installed on the mobile device), the encryption key selection logic 103 may determine that the transaction is an in person transaction that occurs at a location of the merchant (e.g., an in-store transaction). The encryption key selection logic 103 may select the appropriate encryption key based on the transaction data received from the access device 106. For example, the encryption key selection logic 103 provided on the mobile device 105 may automatically select an encryption key associated with a use policy for in person transactions.

A cryptogram generation logic 104 of the mobile device 105 may encrypt the transaction data or a portion thereof using the selected encryption key in an encryption function to generate a cryptogram. At step 2a, the mobile device 105 may transmit the cryptogram and the token to the access device 106. At step 2b, the access device 106 may pass the cryptogram and the token to the acquirer 108. The acquirer 108 may generate an authorization request message and incorporate the cryptogram and the token in the authorization request message. In some embodiments, the authorization request message may be generated by the access device 106 and transmitted to the acquirer 108 at step 2b. The acquirer 108 may transmit the authorization request message to the server computer 110 at step 3. In some embodiments, the authorization request message may also include an indicator of the type of the transaction. For example, the mobile device 105 may generate the indicator of the type of the transaction and transmit the indicator along with the cryptogram to the access device 106.

Authorization logic 116 of the server computer 110 may determine the transaction type based on the indicator included in the authorization request message. In some embodiments, the transaction type may be incorporated in the authorization request message. The authorization logic 116 may determine the encryption key by first analyzing the token to determine the real account number associated with the token. The real account number (or token) may then be used to determine the particular set of encryption keys associated with the real account number. The authorization logic 116 may then determine the appropriate encryption key to be used for the transaction type. For example, data in the authorization request message may indicate that the authorization request message originated from an access device 106 that is located at a physical merchant location.

The authorization logic 116 may then try to decrypt the cryptogram using the determined encryption key (or in this case the corresponding decryption key) associated with the transaction type. If the cryptogram provided in the authorization request message is generated using the appropriate encryption key, the authorization logic 116 can successfully decrypt the cryptogram and obtain the transaction data. In other embodiments, the authorization logic 116 can attempt to regenerate the cryptogram that is received using the determined encryption key and the appropriate data obtained from the authorization request message. If the generated cryptogram matches the received cryptogram, the transaction may be considered temporarily authorized by the server computer 110.

At step 4, the server computer 110 may modify the authorization request message to replace the token with corresponding sensitive user data and send the modified authorization request to the issuer 114. According to various embodiments, the authorization logic 116 may detect the type of the transaction and apply corresponding risk policies to the token. If the token passes the risk threshold determined by the risk policies, the server computer 110 may then transmit the authorization request message to the issuer 114.

The issuer 114 may authorize or deny the transaction based on the sensitive user data. For example, if the sensitive user data contains a user payment account number, the issuer 114 may determine whether the account has enough funds to pay for the transaction amount. If there are enough funds, the issuer 114 may approve transaction. If the account has insufficient funds, the issuer 114 may deny the transaction. The issuer 114 may generate an authorization response message. The authorization response message may include an indicator approving or denying the authorization request. The issuer 114 may send the authorization response message to the acquirer 108 at step 5 via the server computer 110. The acquirer 108 may send the authorization response message to the access device 106 at step 6.

At the end of the day or some other predetermined period of time, a clearing and settlement process may occur between the acquirer 108, the server computer 110, and the issuer 114.

In some embodiments, the authorization logic 116 cannot verify the received cryptogram and the transaction may be denied. For example, if the authorization logic 116 cannot decrypt the cryptogram provided in the authorization request message using the identified encryption (or decryption) key, the authorization logic 116 may determine that the received cryptogram was not generated using the appropriate encryption key. Accordingly, the authorization logic 116 may automatically deny the authorization request message received from the acquirer 108, without passing the authorization request message to the issuer 114. An authorization response message may then be send to the access device 106 via the acquirer 108 denying the transaction.

FIG. 1B illustrates a remote payment transaction 150 where a customer may interact with a merchant website on the mobile device 105 using a mobile application or a web browser installed on the mobile device 105. At step 1, based on the interaction with the merchant website, the encryption key selection logic 103 provided on the mobile device 105 may determine that the transaction is an online transaction (e.g., a card-not-present transaction) 150 and select the appropriate encryption key for remote payment transactions among the multiple encryption keys stored on the mobile device 105 (or on a remote server such as the server computer 110). A cryptogram generation logic 104 may determine that the mobile device 105 is conducting a remote payment transaction, because the mobile application or web browser is in use. The cryptogram generation logic 104 of the mobile device 105 may generate a cryptogram by encrypting the transaction data or a portion thereof using the selected encryption key intended for remote payment transactions.

At step 2b, the mobile device 105 may provide the cryptogram to the acquirer 108. Steps 3-5 illustrated in FIG. 1B are similar to steps 3-5 illustrated in FIG. 1A and hence, a description of these steps are omitted herein. At step 6 of FIG. 1B, the acquirer 108 may send the authorization response message to the mobile device 105 to finalize the transaction and notify the consumer that the transaction request has been approved or denied. Similar to the embodiment in FIG. 1B, a clearing and settlement process may occur after the authorization response message is sent.

Figure 2:
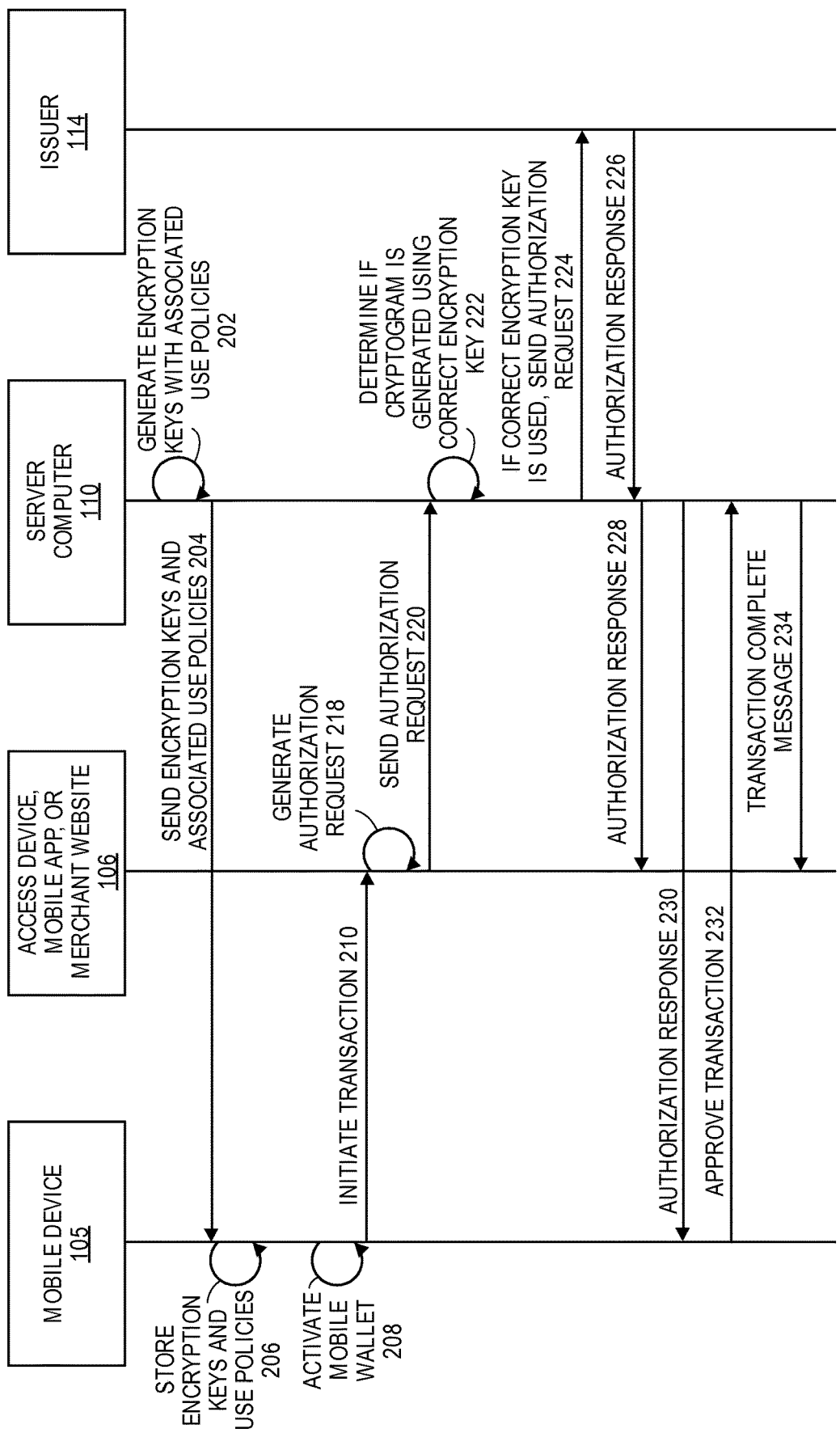
FIG. 2 shows a flow diagram for conducting a transaction using a cryptogram generated with an encryption key in accordance with embodiments of the invention.

FIG. 2 illustrates a flow diagram 200 for conducting a transaction using a cryptogram generated with an encryption key automatically selected based on a transaction type, in accordance with embodiments of the invention.

For purposes of illustration, a payment transaction will be described next. However, embodiments of the invention are not limited to payment transactions, and may be used with other types of transactions such as access transactions discussed below in connection with FIG. 5.

Prior to using a mobile device for payment transactions, a cloud-based backend server (such as a cloud-based payment platform and/or a server computer 110 in communication with the cloud-based payment platform) may generate a token associated with sensitive user data of the consumer. For example, the server computer 110 may generate a token to represent an account number of the user. The server computer 110 may also generate a plurality of encryption keys, e.g., limited use keys (LUKs), based on various types (e.g., channels) of transactions at step 202. Each encryption key may be associated with a use policy indicating the type of transaction the encryption key can be used for. For example, a first LUK may be generated for an in person transactions (LUK-CP), a second LUK may be generated for a remote payment transaction (LUK-CNP), a third LUK may be generated based on a location of the transactions (LUK-geo), a fourth LUK may be generated based on a low value transactions (LUK-low value), and a fifth LUK may be generated based on a high value transactions (LUK-high value). According to various embodiments, other LUKs may be generated, including but not limited to, a sixth LUK generated based on the connection of the mobile device (LUK-online), a seventh LUK generated based on the lack of connection of the mobile device (LUK-offline), etc. One of ordinary skill in the art will appreciate that the number of LUKs are not limited to those enumerated above and that any number of LUKs may be generated based on the types (e.g., channels) of transactions. Each LUK may be used by the mobile device to encrypt transaction data for generating a cryptogram to be used in a specific type of transaction.

The server computer 110 may send and the mobile device 105 may receive the token and the encryption keys (e.g., LUKs) associated with use policies at step 204. The use policy associated with an encryption key may identify the types of transactions where each encryption key may be used. The use policies may include a geographic location-specific transaction use policy, an in person transaction use policy, a remote payments transaction use policy, a low value transaction use policy or a high value transaction use policy. In some embodiments, the encryption keys and corresponding use policies may be stored on a secure memory (e.g., secure element) of the mobile device (step 206). In other embodiments, the encryption keys (or a portion of the encryption keys) and corresponding use policies may be stored on a remote server accessible by the mobile device, such as the cloud-based backend server. For example, each encryption key may be stored along with the associated use policy as an encryption key—use policy pair. In some embodiments, the encryption keys and associated use policies may be stored in form of a look-up table.

At a later point in time, the consumer may activate a cloud-based payment/host card emulation (HCE) mobile wallet application on the mobile device 105, at step 208. At step 210, the consumer may initiate a transaction through the mobile device 105. For example, the consumer may present the mobile device 105 to an access device 106 of a merchant, or the consumer may activate a website of the merchant on a mobile application or a web browser installed on the mobile device 105.

At step 212, the mobile device (or an application on the mobile device such as a wallet application) may receive transaction data for the initiated transaction through a communication channel with the merchant. The communication channel may include any of a near-field communications (NFC) channel between the mobile device and the transacting entity (e.g., the merchant), a communication channel established via direct contact with an access device, a communications channel between a wallet application and a merchant application (or a web browser) installed on the user device, etc. The transaction data may include an amount of the transaction (e.g., a value of the purchased good or service), a merchant identifier, an access device identifier, a location of the merchant, terminal country code, terminal verification results, transaction currency code, transaction date, transaction type, and unpredictable number; and/or may include the application interchange profile (AIP), application transaction counter (ATC), and issuer application data (IAD), etc.

At step 214, the mobile device 105 (e.g., a selection logic of the mobile device) may automatically detect the transaction type based on the received transaction data or the communication channel. The transaction type may include at least one of a geographic location-specific transaction, an in person transaction, a remote payment transaction, a low value transaction or a high value transaction. For example, if the transaction data is received on a communication channel established between the mobile device and an access device, the mobile device 105 may determine that the transaction type is an in person transaction. On the other hand, if the transaction data is received on a communication channel established between a wallet application and a merchant application installed on the mobile device 105, the mobile device 105 may determine that the transaction type is a remote payment transaction. The mobile device 105 may also determine the type of the transaction based on the information included in the transaction data.

Upon determining the transaction type, the mobile device 105 may compare the transaction type to the use policies associated with the encryption keys to find a specific use policy matching the transaction type. For example, if the mobile device 105 determines that the transaction type is an in person transaction, the mobile device 105 may try to identify the encryption key associated with the in person transaction use policy. In order to find the appropriate encryption key, the mobile device 105 may compare the transaction type (e.g., in person transaction) to the use policies stored either on the secure element of the mobile device 105 or on the remote server.

The mobile device may then automatically select the specific encryption key (among the multiple encryption keys stored on the mobile device and/or remote server) that is associated with the specific use policy that matches the transaction type. In the above exemplary embodiment, the mobile device may determine the in person use policy and automatically select the encryption key associated with the in person use policy.

In some embodiments, the transaction may qualify for more than one transaction type. For example, the transaction may be a high value, remote payment transaction that is initiated at a non-local location of the user. Accordingly, the transaction type may match multiple use policies at the same time. For such embodiments, the use policies may be organized in a hierarchy such that if more than one use policy matches the transaction type, the use policy with the highest hierarchical level may be selected as the specific use policy. For example, a non-local transaction use policy may be at a higher hierarchical level than a high value transaction use policy. The high value transaction use policy may be at a higher hierarchical level than a remote payment transaction use policy. As such, for a high value, remote payment transaction that is initiated at a non-local location of the user, the non-local transaction use policy may be selected. According to various embodiments, the geographic location transaction type may be the highest hierarchical level and the encryption key associated with the highest hierarchical level may be selected for use. In other embodiments, different use keys may be assigned to combinations of policies. For example, a first LUK may be assigned if a transaction is an in person transaction that is over $500, while a second LUK may be assigned if a transaction is an in person transaction that is less than $500.

At step 214, the mobile device 105 may generate a cryptogram by encrypting the transaction data using the selected encryption key. For example, if the mobile device 105 determines that the transaction type is an in person transaction and automatically selects the in person encryption key (e.g., in person LUK), the mobile device 105 generates the cryptogram by encrypting the transaction data with the in person encryption key.

At step 216, the mobile device may send the cryptogram along with the token to a transacting entity (e.g., the merchant, an access device 106 of the merchant or an acquirer associated with the merchant) to perform the transaction. Upon receiving the cryptogram and the token, the transacting entity may generate an authorization request message that includes the cryptogram and the token (step 218). The transacting entity may send the authorization request message to a server computer 110 or a payment gateway (step 220).

Upon receiving the authorization request message including the cryptogram (i.e. the transaction data encrypted with the selected encryption key), the server computer 110 may determine the transaction type and the risk policies associated with the transaction type. For example, the server computer 110 may determine that the transaction is an in person transaction and retrieve an in person encryption key (e.g., card-present LUK) for decrypting the cryptogram.

At step 222, the server computer 110 may determine whether the cryptogram is generated using the appropriate encryption key. If the server computer 110 can decrypt the cryptogram using the selected encryption key (e.g., the card-present encryption key in this exemplary embodiment), the server computer 110 may determine that the cryptogram is generated using the appropriate encryption key. The server computer 110 may retrieve the decrypted transaction data. The server computer 110 may also retrieve sensitive user data identified by the token (e.g., an account number of the user) from a token vault. The server computer 110 may then generate an authorization request message including the user data and at least a portion of the transaction data. At step 224, the server computer 110 may send the authorization request message to the issuer 114. The issuer 114 may process the authorization request message, either approve or deny authorization and generate an authorization response message. At step 226, the issuer 114 may send the authorization response message to the server computer 110.

In some embodiments, the server computer 110 may apply the transaction risk policies associated with the identified transaction type to the token and determine whether the transaction should be authorized. The server computer 110 may interact with the issuer 114 in applying the risk policies and determining whether the transaction should be authorized.

On the other hand, if at step 222, the server computer 110 cannot decrypt the cryptogram using the selected encryption key or otherwise verify it, the server computer 110 may determine that the cryptogram is not generated using the appropriate encryption key. Accordingly, the server computer 110 may automatically deny the authorization request message.

At step 228, the server computer 110 may send the authorization response message to the transacting entity, for example to the access device 106 of the merchant, the merchant mobile application or the merchant website. The authorization response message may have been generated by the issuer 114 or generated by the server computer 110, as discussed above. Later, a clearing and settlement process may be performed as explained above.

In some embodiments, the server computer 110 may also send the authorization response message to the mobile device 105 to request user approval for the transaction (step 230). At step 232, the user may approve the transaction and inform the server computer 110 of his/her approval. Upon receiving the user approval, the server computer 110 may send a transaction complete message to the transacting entity.

Embodiments of the present application provide automatic detection and selection of the right type of encryption key for cryptogram generation given the circumstances of the transaction. Along with the selection of the encryption key, risk policies associated with the transaction type may also be selected and applied by the payment processing network. Embodiments provide various parameters (e.g., a location of the transaction, an amount of the transaction, an in person transaction, a remote payment transaction, etc.) that may be used to automatically determine and select the specific encryption key that is designated for a specific transaction type.

Figure 3:
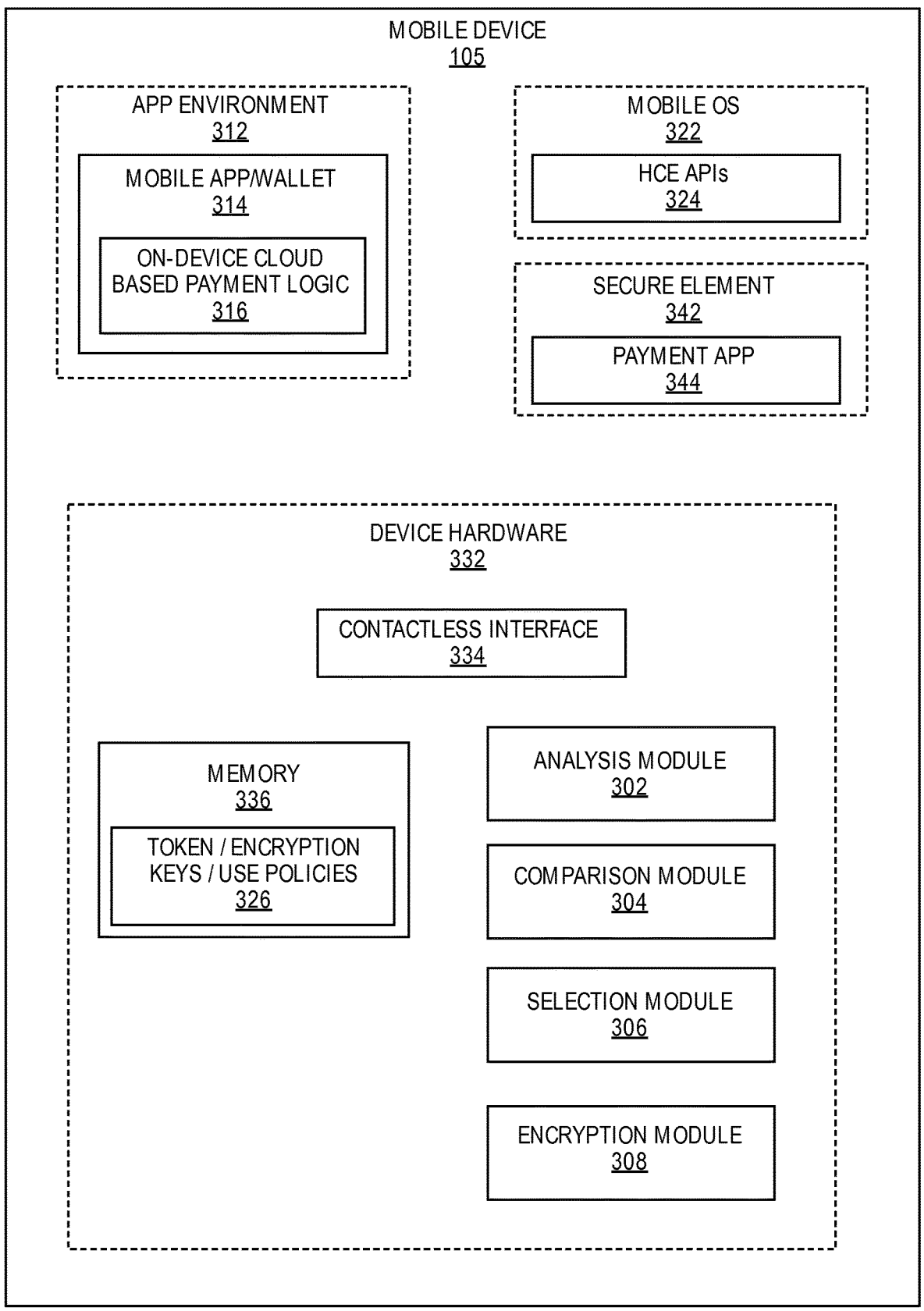
FIG. 3 illustrates a block diagram of an exemplary mobile device in accordance with embodiments of the invention.

According to the embodiments described herein, a mobile device is capable of initiating a transaction, detecting a transaction type and selecting an encryption key among multiple encryption keys based on the transaction type. FIG. 3 illustrates an exemplary mobile device 105, in accordance with embodiments of the invention.

Mobile device 105 includes device hardware 332, mobile operating system (OS) 322, and applications environment 312. Device hardware 332 includes a contactless interface 334 that can contactlessly communicate or otherwise present information to another device such as a contactless reader of a point-of-sale (POS) terminal. The device hardware 332 may also include a memory 336. In some embodiments, the memory may be a secure memory provided in a secure execution environment of the mobile device 105. The memory 336 may store a token associated with a primary account number (PAN) of an owner (or authorized user) of the mobile device 105. The memory 336 may also store one or more encryption keys along with use policies associated with the encryption keys 326. In some embodiments, one or more of the encryption keys 326 and the associated use policies may be stored on a remote server accessible by the mobile device 105.

When a transaction is initiated through the mobile device 105, the mobile device 105 receives transaction data including, for example, transaction amount, transaction location, merchant identifier, terminal country code, terminal verification results, transaction currency code, transaction date, transaction type, and unpredictable number; and/or may include the application interchange profile (AIP), application transaction counter (ATC), and issuer application data (IAD), etc. An analysis module 302 of the mobile device 105 may analyze the incoming transaction data and determine the type of the transaction. For example, the analysis module 302 may determine that the transaction is one or more of an in person transaction, a remote payment transaction, low value transaction, high value transaction, local transaction, non-local transaction, etc. A comparison module 304 of the mobile device 105 may compare the transaction type (determined by the analysis module 302) to the use policies stored on the memory 336 or on the remote server to identify one or more use policies matching the transaction type. Upon identifying the one or more use policies, a selection module 306 of the mobile device 105 may select one of the use policies. For example, if multiple use policies are identified by the comparison module 304, the selection module 306 may select one of the use policies as the selected use policy. In some embodiments the use policies may form a hierarchy. In such embodiments, the selection module 306 may select the use policy at the highest hierarchical level. Upon selecting the use policy matching the transaction type, the mobile device 105 may retrieve the encryption key associated with the selected use policy. An encryption module 308 of the mobile device 105 may then generate a cryptogram by encrypting at least a portion of the transaction data using the retrieved encryption key corresponding the selected use policy. The various modules may be embodied as software residing on a computer readable medium in the mobile device 105.

Applications environment 312 of mobile device 105 may include a mobile application 314 provided by a service provider. For example, if the service provider of mobile application 314 is an issuer, mobile application 314 may be a mobile banking application or a separate mobile payment application. If the service provider is a mobile wallet provider such as a mobile network operator or third-party wallet provider that supports multiple issuers, mobile application 314 may be a mobile wallet application. For merchants, mobile application 314 may be a merchant's own mobile application from which consumers can conduct e-commerce or point of sale transactions, or a mobile wallet application supporting multiple merchants.

In some embodiments, the mobile device 105 may include a secure element (SE) 342. The secure element 342 may include any secure memory device such that the data contained on the secure element 342 cannot easily be hacked, cracked, or obtained by an unauthorized entity. For example, the secure element 342 may be an integrated circuit device that is implemented within a near-field communication (NFC) enabled mobile device 105. The secure element 342 may be provided to the mobile device 105 by the secure element owner, who may also be the mobile network operator (MNO), original equipment manufacturer (OEM), mobile device manufacturer (MDM), or any other suitable entity. Additionally, the secure element 342 may be either embedded in the handset of the mobile device 105 or in a subscriber identity module (SIM) card that may be removable from the mobile device 105. The secure element 342 can also be included in an add-on device such as a micro-Secure Digital (microSD) card or the like. In some embodiments, the token associated with a primary account number (PAN) of an owner (or authorized user) of the mobile device 105 and the encryption keys along with use policies associated with the encryption keys may be stored on the secure element 342.

In secure element 342 based implementations, a contactless application (e.g., a mobile wallet or payment application 344 for contactless transactions) using a contactless interface to communicate with a contactless reader may be coded for and executed on the secure element 342 in order to gain access to the contactless interface. The entity issuing/provisioning the mobile wallet or the payment application 344 may need a secure element key and/or a token to install and personalize the mobile application 344 on the secure element 342. The secure element key may typically be determined and provided by the secure element owner or secure element issuer. The secure element key may be used to ensure that the secure element 342 is highly secure and that only entities that have the permission of the secure element owner or secure element trusted service manager may communicate or access data on the secure element 342.

An encryption key, such as a unique derived key (UDK) may be used by the secure element 342 application to create a secure connection between the mobile device 105 and a mobile gateway. The mobile gateway may provide a secure communication path between the mobile device 105 and an issuer of the payment application 344 using the UDK. The UDK may be derived from a master key provided by a mobile payment application issuer, the trusted service manager, or a secure element issuer. In secure element-based payments, the UDK may be used to transmit a cryptogram generated using one of the multiple encryption keys stored by the mobile device 105. In some embodiments, the encryption module 308 generating the cryptogram described above may be embedded in the secure element 342.

In some embodiments, mobile application 314 may include on-device cloud-based payment logic 316 integrated into mobile application 314 to support cloud-based payments. The on-device cloud-based payment logic 316 performs functions to facilitate cloud-based payments such as to take account parameters provided for use in payment transactions and deliver them to mobile operating system 322 for transmission over contactless interface 334. The on-device cloud-based payment logic 316 also manages the initial service profile parameters that are provided after an account has been provisioned to ensure that requests for account parameter replenishment and other account parameter management activities are initiated.

In embodiments of the present invention, mobile device 105 may include a mobile OS 322 that has a card emulation application programming interface (API) 324 (e.g., a host card emulation (HCE) API) to allow a contactless application (e.g., mobile software application 314) to access contactless interface 334 without requiring the use of a secure element. For example, card emulation API 324 may include programming function calls to allow a contactless application to receive and process payment transaction communications such as Application Protocol Data Unit (APDU) commands sent from a contactless reader to be coded for and executed in the mobile OS 322 of mobile device 105. Thus, embodiments of the present invention enables mobile device 105 to conduct contactless payments without requiring access to the secure element 342 on mobile device 105.

Figure 4:
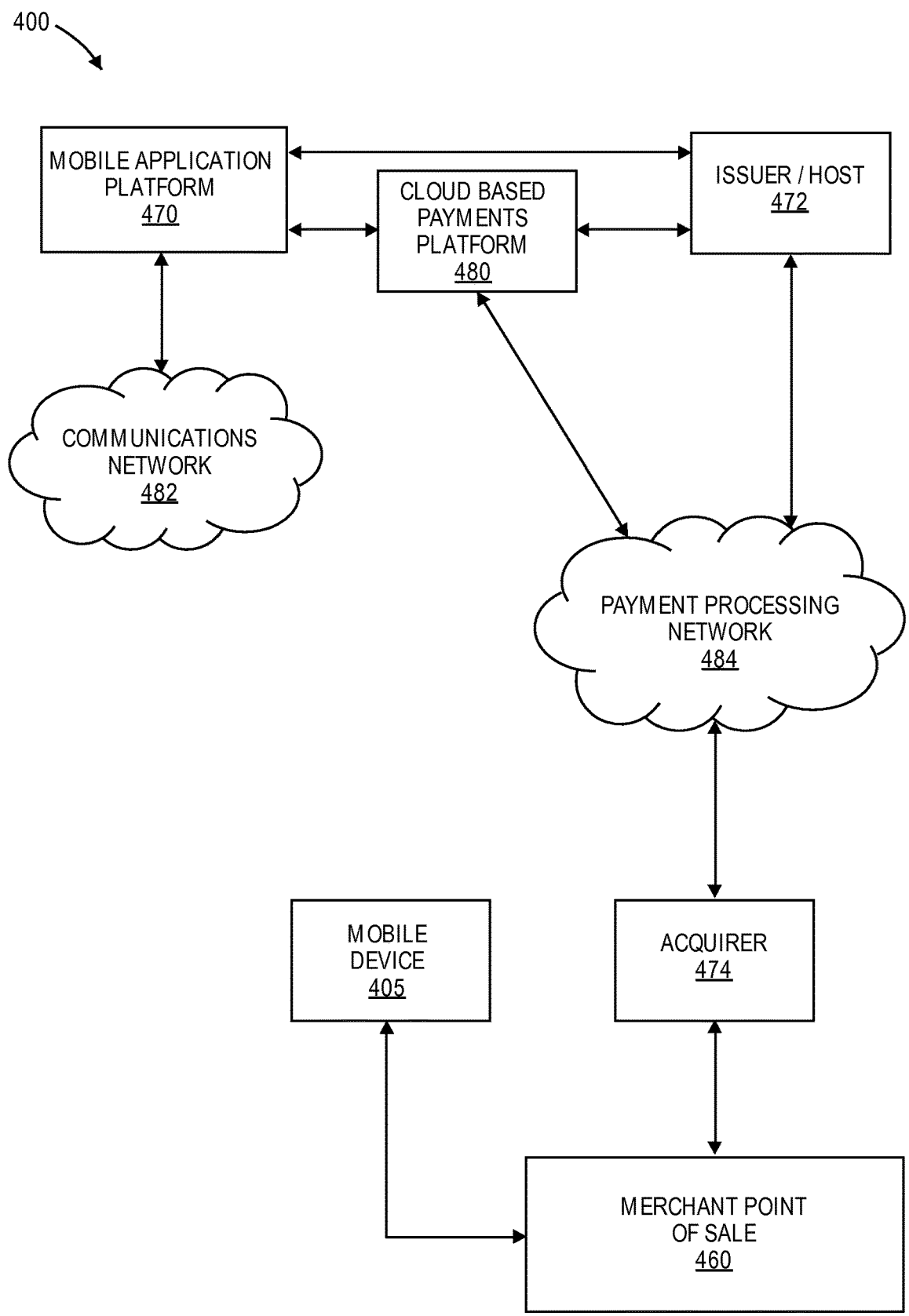
FIG. 4 illustrates a block diagram of an exemplary system for selecting and using of different encryption keys to encrypt payment tokens in a cloud-based/host card emulation (HCE) payment transaction in accordance with embodiments of the invention.

FIG. 4 illustrates an exemplary system 400 for selection and use of different encryption keys to encrypt transaction data in a cloud-based/host card emulation (HCE) payment transaction, in accordance with embodiments of the invention. System 400 includes a mobile device 105 which may be used to conduct a secure element-based transaction as well as a cloud-based payment without using the secure element 342 of the mobile device 105.

Cloud-based payment transactions using the mobile device 105 may be facilitated by a cloud-based payments platform (CBPP) 480, and a mobile application platform (MAP) 470. CBPP 480 may be implemented using one or more computing devices, and can be associated with or operated by an issuer, payment processor, and/or other suitable entities. CBPP 480 implements a set of functionalities including cloud-based payment account management, and account parameters generation and replenishment to enable could-based payments via mobile device 105. MAP 470 is used to facilitate communications between CBPP 480 and mobile application 314 in mobile device 105. MAP 470 may be implemented using one or more computing devices, and can be associated with or operated by the service provider of mobile software application 314, such as an issuer, a mobile wallet provider, a merchant, and/or other suitable entities. In some embodiments, MAP 470 can be associated with or operated by the same entity as CBPP 480, or they can be separate. MAP 470 is used to intermediate requests between the mobile application 314 and CBPP 480, and to ensure that requests and responses initiated by either party are fulfilled once connectivity to mobile device 105 is established, for example, via a communications network 482 (e.g., internet, mobile or cellular network, etc.). It should be understood that in some embodiments, one or more functionalities of CBPP 480, MAP 470, and/or issuer or host processing system 472, may be integrated into the same or different computing devices.

Transactions may be conducted via mobile device 105 by interacting with a contactless reader of a POS terminal (e.g., at a merchant location). Acquirer 474 may be connected to an issuer or host processing system 472 via payment processing network 484. Payment processing network 484 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. Payment processing network 484 may use any suitable wired or wireless network, including the Internet.

Payment processing network 484 may include data processing subsystems, networks, and operations used to support and deliver authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Each of the entities (e.g., acquirer 474, payment processing network 484, issuer or host processing system 472) may comprise one or more computing to enable communications, or to perform one or more of the functions described herein.

To conduct a payment transaction, a user of mobile device 105 may tap mobile device 105 against contactless reader (e.g., via NFC) of POS 460, or display an image such as a bar code or QR code on a screen of mobile device 105 that can be scanned by contactless reader (e.g., an optical scanner or reader) of POS 460. In some embodiments, mobile device 105 may provide POS 460 with an account identifier (e.g., an alternate PAN, a token, etc.) and additional information such as limited-use account parameters or information derived from the limited-use account parameters. For example, an account identifier and/or additional information (e.g., account parameters) can be encoded in a bar code or QR code that is scanned by POS 460, or the account identifier and/or additional information can be transmitted to POS 460 via NFC.

POS 460 or a merchant computer coupled to POS 460 may generate an authorization request message including the account identifier and additional information (e.g., limited-use account parameters, or information derived from the limited-use account parameters), and forward the authorization request message to acquirer 474. The authorization request message is then sent to payment processing network 484. Payment processing network 484 then forwards the authorization request message to the corresponding issuer or host processing system 472 associated with an issuer of the account associated with mobile device 105.

After issuer or host processing system 472 receives the authorization request message, the authorization request message may be parsed. In cloud based payments, the information in the authorization request message may be sent to CBPP 480 for verification. An authorization response message is then sent back to payment processing network 484 to indicate whether the current transaction is authorized (or not authorized). Payment processing network 484 then forwards the authorization response message back to acquirer 474. In some embodiments, payment processing network 484 may decline the transaction even if issuer or host processing system 472 has authorized the transaction, for example depending on a value of a fraud risk score or depending if limited-use account parameters are verified by CBPP 480. Acquirer 474 then sends the authorization response message to the merchant computer and/or POS 460. The authorization response results may be displayed by POS 460, or may be printed out on a physical receipt.

Alternately, if the transaction is an online transaction, the merchant may provide a web page or other indication of the authorization response message as a virtual receipt. The receipts may include transaction data for the transaction.

At the end of the day, a normal clearing and settlement process can be conducted by payment processing network 484. A clearing process is a process of exchanging financial details between an acquirer and an issuer to facilitate posting to a customer's payment account and reconciliation of the user's settlement position.

Embodiments have a number of advantages. For example, according to some embodiments, one token and multiple encryption keys may be provided for a same account number. Each encryption key may be associated with a use policy. Accordingly, if the token and/or the encryption key is compromised, the party using the encryption key must also know the context that the key is intended for. The encryption key cannot be successfully used if it is not used in the intended context. Accordingly, embodiments provide additional security when using tokens and encryption keys in transactions.

Moreover, embodiments may be implemented using multiple tokens and multiple encryption keys. However, when a different payment token is created for six different potential communication channels, then the number of tokens that may be associated with a single account for a single person would increase by six relative to the case where that person only has a single token for all channels. The six fold increase in the number of payment tokens in this example can lead to issues regarding the number of available tokens that can be created if there are in fact millions of potential users. Accordingly, using multiple encryption keys along with a same token helps to control the number of available tokens.

Figure 5:
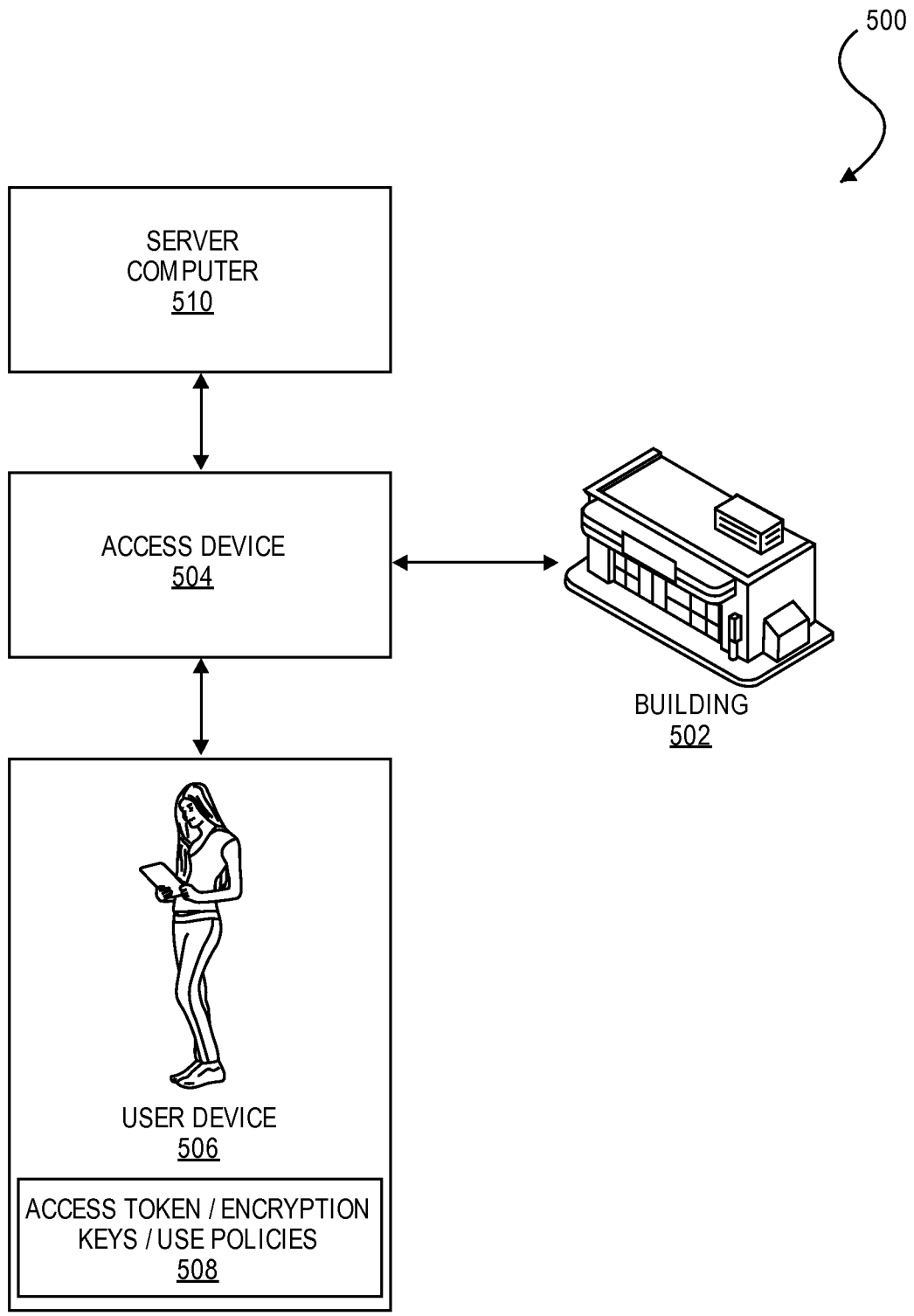
FIG. 5 illustrates an exemplary building access system for selection and use of different encryption keys to encrypt access tokens in accordance with embodiments of the invention.

FIG. 5 illustrates an exemplary building access system 500 for selection and use of different encryption keys to encrypt access data, in accordance with embodiments of the invention. A user may interact with an access device 504 of a building 502 through a user device 506. An access token, a plurality of encryption keys and use policies associated with the encryption keys 508 may be stored on the user device. The access token may be generated to serve as a proxy for the sensitive user information such as user identification number, user social security number, etc. The use policies may indicate the type of access transaction that each encryption key is meant to be used. For example, a first encryption key may be used for daytime access to the building 502, a second encryption key may be used for night time access to the building 502, a third encryption key may be used for access to restricted floors of the building 502, a fourth encryption key may be used for access to common areas of the building 502, etc.

The user device 506 may identify the type of access based on an interaction between the user device 506 and the access device 504. For example, the user device 506 may identify that the user is trying to access the restricted areas of the building 502 based on, for example, a location of the access device 504. Alternatively, the access device 504 may provide the access type (e.g., that the user is trying to access restricted areas of the building 502) to the user device 506. The user device 506 may identify the encryption key to be used for accessing the building 502 based on the access type. The user device 506 may then create a cryptogram using the identified encryption key by encrypting access details. In some embodiments embodiment, a corresponding token may or may not be used with the cryptogram.

The user device 506 may provide the cryptogram along with the access token to the access device 504. The access device 504 may pass the cryptogram and the access token to a server computer 510 for verification. The server computer 510 may determine whether the cryptogram is generated using the appropriate encryption key. In some embodiments, the server computer 510 may have provisioned the encryption keys and the associated use policies on the user device 506. If the server computer 510 determines that the cryptogram is generated using the appropriate encryption key, the server computer 510 may send an instruction to the access device 504 to allow access to the building 502. If the server computer 510 determines that the cryptogram is not generated using the appropriate encryption key, the server computer 510 may send an instruction to the access device 504 to deny entry to the building 502. In the latter case, the server computer 510 may determine that the encryption keys and/or the user device 506 may have been compromised.

Figure 6:
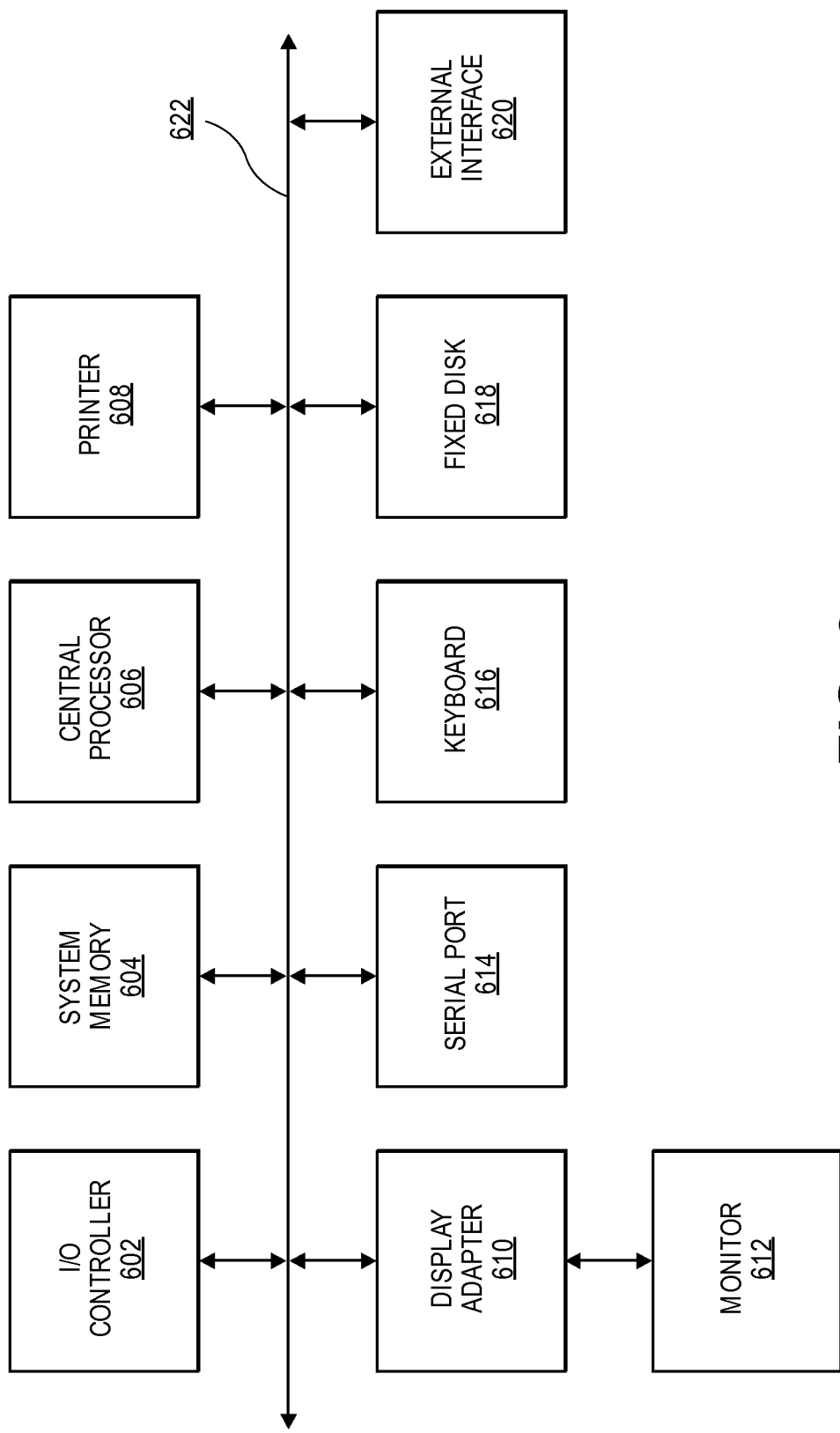
FIG. 6 shows an exemplary computer system, in accordance with embodiments of the present invention.

The various participants and elements shown in FIGS. 1-5 may operate one or more computer apparatuses (e.g., a server computer) to facilitate the functions described herein. Any of the elements in FIGS. 1-5 may use any suitable number of subsystems to facilitate the functions described herein. Examples of such subsystems or components are shown in FIG. 6. The subsystems shown in FIG. 6 are interconnected via a system bus 622. The subsystems such as a printer 608, keyboard 616, fixed disk 618 (or other memory comprising computer-readable media), monitor 612, which is coupled to a display adapter 610, and others are shown. Peripherals and input/output (I/O) devices, which couple to I/O controller 602, can be connected to the computer system by any number of means known in the art, such as serial port 614. For example, serial port 614 or external interface 620 can be used to connect the computer apparatus to a wide area network such as the Internet, a mouse input device, or a scanner. The interconnection via system bus allows the central processor 606 to communicate with each subsystem and to control the execution of instructions from system memory 604 or the fixed disk 618, as well as the exchange of information between subsystems. The system memory 604 and/or the fixed disk 618 may embody computer-readable medium.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
generating, by a server computer, a plurality of encryption keys associated with an account, wherein each encryption key is associated with a given transaction type;
provisioning, by the server computer, the plurality of encryption keys on a communication device;
receiving, at the server computer, an authorization request message for a transaction associated with the communication device, wherein the authorization request message includes a cryptogram and transaction data;
identifying, by the server computer, a transaction type of the transaction based on the transaction data;
determining, by the server computer, whether the cryptogram was generated using an encryption key associated with the transaction type for the transaction;
if the cryptogram was generated using the encryption key created for the transaction type, then approving of the transaction by the server computer; and
if the cryptogram was not generated using the encryption key created for the transaction type, then denying the transaction by the server computer without communicating the authorization request message to an issuer of the account.

2. The method of claim 1, wherein:
the transaction type includes one of a geographic location-specific transaction, an in person transaction, and a remote payment transaction.

3. A server computer, comprising:
one or more processors; and
a non-transitory computer readable storage medium communicatively coupled with the one or more processors and storing instructions which, when executed by the one or more processors, cause the server computer to:
generate a plurality of encryption keys associated with an account, wherein each encryption key is associated with a given transaction type;

provision the plurality of encryption keys on a communication device;

receive an authorization request message for a transaction associated with the initiated by a communication device, wherein the authorization request message includes a cryptogram and transaction data;

identify a transaction type of the transaction based on the transaction data;

determine whether the cryptogram was generated using an encryption key associated with the transaction type for the transaction;

if the cryptogram was generated using the encryption key associated with the transaction type, then approve the transaction; and if the cryptogram was not generated using the encryption key associated with the transaction type, then deny the transaction without communicating the authorization request message to an issuer of the account.

4. The server computer of claim 3, wherein the server computer is in a payment processing network.

5. The server computer of claim 3, wherein the authorization request message further comprises a token.

6. The server computer of claim 3, wherein the transaction type includes one of a geographic location-specific transaction, an in person transaction, and a remote payment transaction.

7. A system comprising:
a communication device configured to initiate a transaction; and
a server computer, comprising:
one or more processors; and
a non-transitory computer readable storage medium communicatively coupled with the one or more processors and storing instructions which, when executed by the one or more processors, cause the server computer to:
generate a plurality of encryption keys associated with an account, wherein each encryption key is associated with a given transaction type;
provision the plurality of encryption keys on the communication device;
receive an authorization request message for the transaction, wherein the authorization request message includes a cryptogram and transaction data;
identify a transaction type of the transaction based on the transaction data;
determine whether the cryptogram was generated using an encryption key associated with the transaction type for the transaction;
if the cryptogram was generated using the encryption key associated with the transaction type, then approve the transaction; and
if the cryptogram was not generated using the encryption key associated with the transaction type, then deny the transaction without communicating the authorization request message to an issuer of the account.

8. The method of claim 1, further comprising:
prior to receiving the authorization request message,
transmitting, by the server computer to the communication device, the plurality of encryption keys associated with the account.

9. The method of claim 1, further comprising:
storing, by the server computer, the plurality of encryption keys associated with the account at a storage accessible by the communication device.

10. The method of claim 1, wherein the encryption key is a limited use key and wherein the communication device is a mobile device.

11. The method of claim 1, wherein the transaction data includes a token identifying the account.

12. The method of claim 1, further comprising:
determining a decryption key corresponding to the encryption key associated with the transaction type for the transaction;
decrypting the cryptogram using the decryption key corresponding to the encryption key;
obtaining decrypted transaction data based on the decrypting;
modifying the authorization request message to incorporate the decrypted transaction data; and
transmitting modified authorization request message to the issuer of the account.

* * * * *